June 10, 1958 A. R. KITTLESON ET AL Re. 24,485

METHOD OF CARRYING OUT HOMOGENEOUS VAPOR PHASE REACTIONS

Original Filed Feb. 27, 1953 2 Sheets-Sheet 1

Jennings H. Jones
Erving Arundale
Allen R. Kittleson
Merrell R. Fenske
INVENTORS BY Peter H. Grollea
ATTORNEY United States Patent Office Re. 24,485
Reissued June 10, 1958

24,485

METHOD OF CARRYING OUT HOMOGENEOUS VAPOR PHASE REACTIONS

Allen R. Kittleson and Erving Arundale, Westfield, N. J., and Jennings H. Jones and Merrell R. Fenske, State College, Pa., assignors to Esso Research and Engineering Company, a corporation of Delaware Original No. 2,809,981, dated October 15, 1957, Serial No. 339,308, February 27, 1953. Application for reissue December 10, 1957, Serial No. 703,989

9 Claims. (Cl. 260—451)

Matter enclosed in heavy brackets [ ] appears in the original patent but forms no part of this reissue specification; matter printed in italics indicates the additions made by reissue.

This invention relates to homogeneous vapor phase, chain type reactions such as oxidations or halogenations carried out in contact with a turbulent phase of finely divided solids. More particularly it relates to non-catalytic vapor phase partial oxidation of hydrocarbons wherein dense fluidized inert solids serve as a means of improving the selectivity of the reaction by quenching existing reactive centers. Still more specifically it relates to an improved process wherein hydrocarbons such as light and heavy naphthas rich in paraffins or naphthenes are oxidatively dehydrogenated to yield desirable oxygenated compounds and liquid olefins.

It is well known that the vapor phase selective non-catalytic oxidation of paraffin hydrocarbons is an essentially homogeneous chain reaction which is initiated at temperatures in the range of 260 to 320° C. After the reaction is spontaneously initiated, extremely rapid oxidation takes place giving rise to a phenomenon called a "cool flame." Because of the extremely rapid oxidation rate, the reaction takes place in a very small portion of the reaction chamber, and this is normally reflected by a sharp temperature increase of some 150 to 200° C. in this reactive region. The increased temperature causes an undesirable loss in selectivity of the reaction, and may lead to complete conversion of the feed into water and oxides of carbon.

This undesirable effect of temperature, or lack of temperature control means, is shown by the data presented in the following Table 1.

TABLE 1

Effect of temperature on the vapor-phase, non-catalytic, oxidation of hydrocarbons in an empty steel reactor

| Hydrocarbon Oxidized | N-Heptane | | | Light E. Texas Virgin Naphtha (Boiling Range=150 to 240° F.) | | | |
|---|---|---|---|---|---|---|---|
| Composition of Vaporous Feed: | | | | | | | |
| Vol. Percent Hydrocarbon | 5.4 | | | 17.4 | | | |
| Vol. Percent Oxygen | 4.8 | | | 14.8 | | | |
| Vol. Percent Steam or Nitrogen | 89.8 | | | 67.8 | | | |
| Contact time, Seconds | 3 | | | 10 | | | |
| Oxygen/Hydrocarbon Mole Ratio | 0.89 | | | 0.85 | | | |
| Reaction Temperature, ° C. (Average) | 360 | 400 | 450 | 380 | 415 | 430 | 450 |
| Percent Hydrocarbon Reacting | 30 | 29 | 16 | 35 | 30 | 15 | 15 |
| Percent Oxygen Reacting | 72 | 73 | 53 | 94 | 95 | 97 | 97 |
| Analytical Data on Hydrocarbon Layer: | | | | | | | |
| Carbonyls (g. Oxygen/100 g. HC Layer) | 0.8 | 0.7 | 0.3 | 0.7 | 0.5 | 0.2 | 0.3 |
| Bromine No. | 10.7 | 13.0 | 10.5 | 17.1 | 12.3 | 4.2 | 4.4 |
| Vol. Percent Sol. in 98% $H_2SO_4$ | 20 | 19 | 9 | 18 | 16 | 5.5 | 5 |
| Percent Selectivity to: | | | | | | | |
| Non-Condensable Gas | 17.7 | 18.2 | 30.2 | 25 | ------ | ------ | 50 |
| Liquid Olefins | 10.8 | 16.8 | 22.4 | 25 | ------ | ------ | 20 |
| Epoxides | 36.8 | 35.3 | 26.1 | 25 | ------ | ------ | 10 |
| Carbonyls | 19.6 | 15.2 | 12.0 | 15 | ------ | ------ | 8 |

The above data were obtained from runs made in the presence of an excess of diluent such as steam in order to control the reaction temperature as closely as possible. For both hydrocarbon feeds listed in the table, as the reaction temperature was raised the proportion of hydrocarbon undergoing reaction fell off rapidly. In addition, for the case of the n-heptane runs the conversion of oxygen decreased with the rise in temperature. The overall decrease in reactivity was accompanied by a decrease in the selective yield of useful oxygenated compounds, and by an increase in the production of undesirable non-condensable gas which was rich in carbon dioxide.

The magnitude of the temperature increase can be controlled somewhat by adjustment either of the rate of feed or the oxygen-hydrocarbon ratio, by the use of an inert diluent, or by introducing oxygen at numerous successive points along the reaction zone. However, none of these variables may be employed with complete success in an open tube as such a system is ultimately limited by the relatively poor flow of reaction heat from the gaseous reaction phase to the walls of the reaction vessel. Besides, the use of diluent is often considered undesirable because it complicates the recovery system as compared with a process using essentially pure oxygen or an oxygen-rich gas as the oxidant. Furthermore, even in the presence of from 60 to 90 volume percent of a diluent so much reaction heat is generated that temperature ranges of from 30 to 120° C. or more above the desired value may exist in an open reactor. The previously shown adverse effect of unduly high temperatures and the inadequacy of conventional means for controlling the reaction temperature thus clearly demonstrate the need either for attaining uniform distribution of temperature throughout a reaction zone, or for quickly and efficiently removing the reaction heat from the gas phase reaction.

In order to obtain reasonably high conversions of hydrocarbon per pass, it is desirable to employ oxygen in a ratio of at least 0.3 or 0.5 mole per mole of hydrocarbon. But these relatively high oxygen ratios tend to heat the reaction zone to the pyrolysis temperature of the hydrocarbon, so that excessive amounts of the feed are converted to relatively undesirable gaseous paraffins, olefins, and carbon oxides. Consequently, the development of suitable temperature control has been one of the principal obstacles to a commercial utilization of the non-catalytic selective oxidation reaction.

Accordingly, various means of cooling the reactor by immersion in a suitable heat exchange medium have been previously proposed. However, this has been only moderately successful in small scale equipment, and relatively ineffective in reactors having larger diameters. It has also heretofore been attempted to control the partial oxidation reaction by passing the reactants over cooling coils or other inert surfaces such as packed beds of granular solids. However, this approach also proved fruitless since inert surfaces have been found to exert an excessive inhibiting or poisoning effect on the reaction. Thus, in the presence of an appreciable inert stationary surface, no oxidation would proceed at all at temperatures as high as 500° C.

Finally, it has also been previously proposed to oxidize hydrocarbons in the presence of various catalysts which, unlike inert solids, do not poison the oxidation but direct the essentially heterogeneous reaction in a direction characteristic of the catalyst used. Nevertheless, because of relatively short life and high cost of the catalyst and the relatively small number of practical reactions, the utility of such catalytic processes has been rather limited to the manufacture of high grade chemicals such as phthalic anhydride, and has proved uneconomical for the upgrading of naphthas and other important uses characterized by narrow profit margins.

It is an object of the present invention to prevent excessive temperatures in the non-catalytic partial oxidation of hydrocarbons and like homogeneous reactions. Another object is to devise a system wherein inert solids can be used for controlling the temperature of homogeneous vapor phase reactions without undesirably inhibiting the reaction. The way in which these and other objects are achieved by means of the present invention will become apparent from the subsequent description and attached drawing.

In the drawing, Figure 1 shows a view in elevation of a useful type of reaction vessel and accessories.

Figure 1:
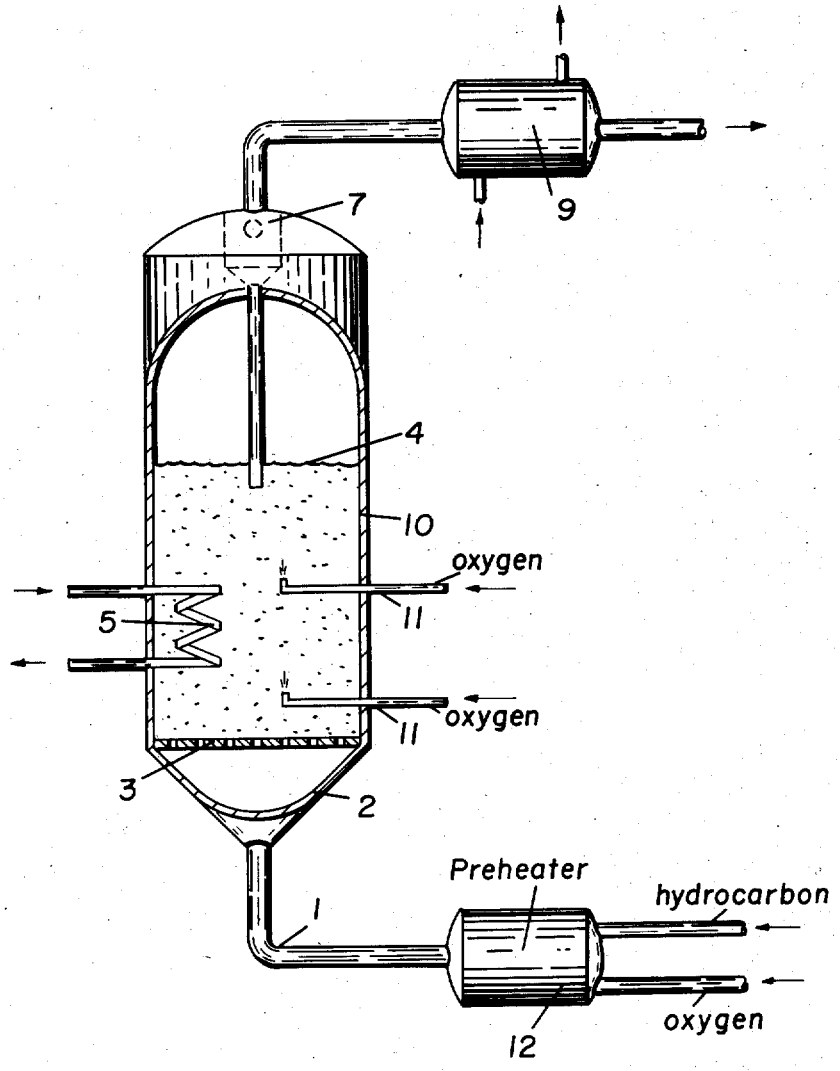

It has now been discovered that, simply by properly adjusting such factors as solid particle size, superficial vapor velocity or flow rate and reactor design, oxidation either may be controlled or inhibited in a bed of inert solids such as glass beads or sand. For instance, in a reactor consisting simply of an annulus formed between a 3.1 inch diameter tube about 18 inches in length in which there was installed a stirrer 2 inches in diameter, the effect of various solids on the oxidation of a variety of hydrocarbons was tested at various temperatures. For purposes of the runs, the hydrocarbon to be oxidized was passed into the bottom of the reactor through a sintered plate installed at the bottom of the 3.1 inch diameter tube while pure oxygen was added to the well-stirred bed at a point about 2 inches above the hydrocarbon inlet. The mixture of hydrocarbon and oxygen then slowly rose through the stirred bed of solids. Provision was made to sample the vapor at numerous points in the bed during the operation and, in addition, the top portion of the bed could be cooled from the outside by means of water or air jets which prevented any reaction between the hydrocarbon and oxygen from taking place in the void space above the bed of solids. The results are presented below in Table 2.

TABLE 2

Vapor phase oxidation of n-heptane in a stirred bed of solids

| Run No. | Solids | Oxygen HC Mole Ratio | Contact Time, Secs. | Max. Temp., ° C. | Vapor Flow Rate, Cu. Ft. Per Hr. | Composition of Non-Condensable Gas | | | | Liquid Product | |
|---|---|---|---|---|---|---|---|---|---|---|---|
| | | | | | | $O_2$ | CO | $CO_2$ | Unsats. | Vol. Percent Sol. in $H_2SO_4$ | Bromine No. |
| 1 | None | 0.25 | 3 | 400 | ---------- | 2.7 | 25.5 | 9.7 | 37.7 | 13 | 12.7 |
| 2 | 300 Micron Size Glass Beads. | 0.25 | 3 | 325 | 6 | 86.8 | 1.7 | 1.3 | 0.7 | 1 | 0.1 |
| 3 | | 0.25 | 3 | 410 | 6 | 75 | -------- | 12 | -------- | 3 | ---------- |
| 4 | | 0.25 | 3 | 450 | 6 | 64.7 | 6.0 | 18.7 | 4.7 | 2 | 2.8 |
| 5 | | 0.25 | 3 | 500 | 6 | 40.7 | 9.7 | 26.0 | 15.8 | 6 | 6.2 |
| 6 | 100 Micron Size Glass Beads. | 0.25 | 6 | 320 | <3 | 25 | 23.7 | 20.0 | 13.7 | 11 | ---------- |
| 7 | | 0.75 | 6 | 370 | <3 | 0.7 | 36.0 | 22.0 | 21.3 | 22 | ---------- |

As shown by the data of Table 2, the normal oxidation reaction took place in the empty reactor with the development of a maximum temperature of 400° C.; this is shown by the low oxygen content of the gas and the sulfuric acid solubility of the liquid product. However, in the presence of 300 micron size glass beads and at a flow rate of about 6 cu. ft. per hour very little oxidation took place at temperatures as high as 450° C. On the other hand, in runs 6 and 7 wherein substantially smaller glass beads were used, reaction did occur at moderate temperatures.

Visual observations made in the same reactor described above, but differing in that the outer metal tube was replaced with a piece of Pyrex glass pipe, showed that when relatively large particles, such as 300 microns or larger, were used in the bed, the vapors passing into the bed were readily dispersed even at gaseous rates of flow as great as 21 cu. ft./hr. On the other hand, when 100 to 150 micron size particles were used in the bed, the gases were not dispersed even at rates as low as 2 cu. ft./hr., but bubbled upward through the bed somewhat as air bubbles through water. As the data of Table 2 show, the runs made using the small glass particles were at a rate of flow of greater than 3 cu. ft./hr., which is above the minimum rate necessary for a dispersed condition. The runs using the larger particles were at a flow rate of about 21 cu. ft./hr., which is less than that necessary to produce bubbles in the bed. The reason for reaction taking place in the bed of smaller particles was that, at the flow rates used, bubbles were formed in the bed and reaction occurred in the bubbles or pockets of vapor. Reaction did not occur in the bed of larger beads because at the flow rates used no pockets or bubbles were formed, but instead they were broken up or dispersed. Further, it has been found that in the presence of such a bed of small particles and at conditions adjusted so that bubbles are formed, relatively large proportions of oxygen may be injected at any one point in the bed without developing points of high temperatures, since the turbulence of the suspended solids tends to equalize the temperature throughout. Besides, the heat of reaction readily may be removed from such a bed by means of cooling coils immersed in the bed, or by circulating the solids to an external cooling zone, or by other means of external cooling.

Thus, it has been demonstrated that beds of inert solids may be used for attaining good control of the desired oxidation reaction. If one uses small particles such as those ranging in size up to about 300 microns, and particularly say 40 to about 220, or if any size of particles are fluidized in such a manner that bubbles are formed, then the reaction takes plate in pockets or bubbles of vapor directly in the bed. On the other hand, by using 300 micron size particles or greater, or by operating at rates sufficiently low so that no vapor pockets are formed within the bed and the solids assume the characteristics of a dense packed bed, the solids will inhibit the oxidation reaction. Consequently, such beds of solids may be used as non-reactive cooling and mixing, or carburization, zones, with the reaction taking place as the reactants leave the bed.

Although the runs reported above were carried out with n-heptane, other hydrocarbons or naphthas behave similarly. Thus, cyclohexane, octene-2, light and heavy naphthas undergo oxidation in the presence of the small insert beads under conditions where bubbles or pockets are formed, but do not oxidize in the presence of a dense bed under conditions such that no vapor pockets are formed.

If inert solids are not employed in the fixed beds, but instead catalytic surfaces are present, then oxidation may occur. Thus, in the presence of a fixed bed composed of a cracking catalyst such as silica-alumina or clay, or a catalyst such as silver deposited on alumina, or a catalyst of copper-zinc on silica gel, or the like, oxidation does occur. However a combustion reaction, which leads to the formation of carbon dioxide and water, is the favored reaction.

In brief, while packed beds of inert granular solids poison the selective vapor phase oxidation of hydrocarbons, fluidized inert solids can act as surprisingly effective temperature modifying means without unduly retarding the reaction, provided that they contain spaces relatively free of solids. More specifically, it has been discovered that turbulently fluidized solids can serve as excellent temperature control means for essentially homogeneous vapor-phase non-catalytic oxidation of normally liquid paraffins such as naphtha, by virtue of the relatively large proportion of vapor filled pockets or voids, or so-called bubbles, in such turbulent fluidized beds.

Such bubbles or low-density regions differ in character from ordinary bubbles in a liquid in that the same gas does not stay in the bubbles in a turbulent fluidized bed. On the contrary, in such a system fresh gas keeps flowing into the bottom of each bubble and leaves the bubble at the top, causing a continuous change in the gas composition of the bubble while the bubble itself rises through the bed at a fairly rapid rate, such as one foot per second or more. It appears that it is precisely a mechanism such as this which permits preheating the feed gases without reacting in the dense phase, whereupon the oxidation takes place when the hydrocarbon-oxygen gas mixture enters into one of the relatively solids-free bubbles, but the resulting hot reaction gases are rapidly quenched or poisoned by the great extent of inert surface as soon as these gases pass through the top or roof of the bubble and re-enter the main dense phase of the fluidized solids.

Thus, a turbulent fluidized bed of solids, essentially consists of a number of small, gas phase reaction zones or cells maintained at high temperature by the exothermic nature of the reaction, these zones being in contact with or enclosed in a moderating body of the dense fluidized phase whose temperature may be controlled by indirect heat exchange within or without the principal reaction vessel. In contrast to the principal advantages normally associated with fluidized beds, the very advantage of the turbulent fluidized bed in the present case is its non-uniformity, that is, the existence of the small, hot gas cells of ever changing composition within the fluidized, dense phase of more moderate temperatures. The high temperature within the small gas cells permits propagation of the oxidative chain reaction, whereas the surrounding inert dense phase acts as an efficient quenching medium by virtue of its chemically inhibiting effect as well as its somewhat lower temperature. On the other hand, if the entire fluid bed is made homogeneous, as when the bubbles are being continuously broken up as soon as they are formed, such a fluidized bed becomes useless for the purposes of the present invention. In such a case there are no longer any gas phases available in which the reaction can take place, whereas the large surface area of the fluidized inert solids in the homogeneous, bubble-free dense phase will poison the oxidation reaction just as a packed bed will.

To provide a fluidized bed of suitable turbulence or bubble content for the purpose of the present invention, it is desirable to fluidize the inert solids by passing the reaction gases upwardly through the particulate solids at a superficial linear gas velocity of about 0.3 to 5 feet per second, e. g. 0.5 to 1.5 feet per second. Or in other words, the gas velocity necessary to produce bubbles is above that which is required to support the weight of the bed. A high ratio of total depth to diameter of the dense bed also tends to be beneficial for purposes of the invention in that reactors designed to permit such high ratios tend to favor the existence of a relatively high proportion of bubble space within the dense phase bed. Accordingly, the depth/diameter ratio may advantageously be at least 2/1, and may well be as much as 5/1 to 10/1 or more.

Specificially, as a bubble rises through a dense fluidized bed, it grows in size due to the gradually decreasing pressure. If the fluidized bed is deep enough, this bubble growth may proceed until the bubble reaches the size of the reactor diameter, whereupon a more or less solids-free gas phase having the width of the reactor may push ahead of itself a slug of densely fluidized solid particles until the gas phase gradually works itself through the dense slug to the top. The likelihood of such slugging is particularly great in vessels of relatively small diameter and increases with increasing size of the solid particles. Thus, with particles having diameters in the range from 200 to 300 microns slugging may occur in vessels having a diameter as large as 18 or even 24 inches, whereas with very fine particles having diameters in the range from about 40 to 100 microns slugging tends to occur only in relatively slim vessels having diameters of about 2 or 4 inches.

Another manner in which slugging or bubbles may be produced in a fluidized bed is to insert at intervals in the length of the reactor tube a number of wire screens or trays or other similar separating sections. In this way, on passing vapor upward through the reactor, bubbles or slugging tends to occur in the vicinity of the screens.

An oxidation system embodying the advantages of this invention will be described with reference to accompanying Figure 1. In this scheme vaporized hydrocarbon feed may be passed through line 1, distributing cone 2 and grid or sintered plate 3 into reaction chamber 10. Oxygen is also fed into reactor chamber 10. It may be advantageous to preheat the oxygen in admixture with the hydrocarbon feed in a conventional preheater 12. Alternatively, all or at least a part of the oxygen may be injected directly into the fluid bed by means of one or more oxygen lines 11. In preheating the feed it is important to avoid temperatures which might be high enough to initiate the oxidation reaction before the gases enter the fluid bed. Thus, where a mixed hydrocarbon-oxygen gas is fed to the reactor, it is advisable to keep the preheat temperature of such a feed at least about 50° C. below the initiation temperature. Depending on the nature of the particular hydrocarbon feed employed, the preheat temperature may accordingly be between about 150 and 250° C. Of course, where the hydrocarbon feed and oxygen are introduced as separate streams directly into the fluid bed, either or both of such streams may be preheated substantially to the initiation temperature. Reactor 10 also contains finely divided inert solids such as sand, through which the reaction gases are passed at a linear upward superficial velocity of about 0.5 to 1.5 feet per second. Consequently the solids form in the lower part of reactor 10 a dense turbulent fluidized phase which has an upper level 4, with a dilute gas phase above this level.

In starting up the reaction, the reactants may be brought up to the required initiation temperature either by externally heating the reactor, or by temporarily preheating the gas feed to higher than the aforementioned preheat temperature, or by feeding hot solids from a burner. This is especially convenient in a two-vessel fluid system of the general type conventionally used in fluid catalytic cracking, in which case one vessel may be used for carrying out the desired partial oxidation reaction and the other vessel may serve to keep the finely divided solids at the proper temperature by either heating or cooling, the solids being continuously circulated between the two vessels. Arrangements useful in obtaining such circulation of the powdered solids between the two vessels, as well as the construction of the equipment involved, are of course well known from other arts using the fluid solids technique and therefore need not be described here. Thus, when using a two-vessel system, the novel oxidation process may be started by raising the solids in the reactor to the required temperature by heating them in the other vessel by contact with burning or other hot gases and by circulating the resulting hot solids to the reactor. Of course, once the reactor reaches the desired temperature, and the exothermic oxidation is initiated, all extraneous heating is usually stopped, except that it may be advisable to continue using preheater 12 in the manner earlier described in order to keep a normally liquid hydrocarbon feed such as naphtha above its condensation point.

Excess heat may be removed from the reaction zone after start of the reaction either by means of internal heat exchanger 5 or devices such as external cooling jackets, or it may be preferred to circulate the solids to a separate vessel where they may be blown with a cool gas or passed over cooling surfaces, and the resulting cooled solids are finely returned to the oxidation reactor. In two-vessel systems it may be convenient to use the same vessel as a burner during the start-up period to heat up the circulating solids, and as a cooler for removing excess heat during the main part of the process.

Referring again to Figure 1, as the hydrocarbon and oxygen mixture passes through the dense turbulent bed in reactor 10, substantially all of the oxygen is rapidly used up while the turbulence of the fluidized solids assures uniform temperature distribution without excessive local overheating. However, as pointed out earlier, the temperature within the existing gas bubbles tends to be higher than in the surrounding dense phase. Accordingly, when specific reaction temperatures are mentioned herein, it will be understood that these refer to the average or composite temperature of the turbulent fluidized bed, and not necessarily to the temperature at which the reaction may actualy proceed within the individual gas bubbles contained within the bed.

In order to have a reactor where holes or slugging in the flnuidized bed are prevalent, and yet have a reaction time of only a few seconds for a large commercial size reactor, it is desirable to have a cellular arrangement in the bed. Thus the bed may be composed of a grid-like, cellular arrangement or honeycomb with the long axis of the cells positioned vertically in the overall bed. These cells may be made from light sheet metal and positioned in the bed a short distance above the grid or bottom of the fluidized bed. Their configuration is immaterial, and they may comprise, in cross sections, squares, octagons, circles, or rectangles. Their principal dimensional requirements are dictated by their ability to produce bubble- or slug-flow in the fluidized beds in each cell; this usually happens when the ratio of length of the cell, compared to its effective diameter, is 5 or more.

Figure 2:
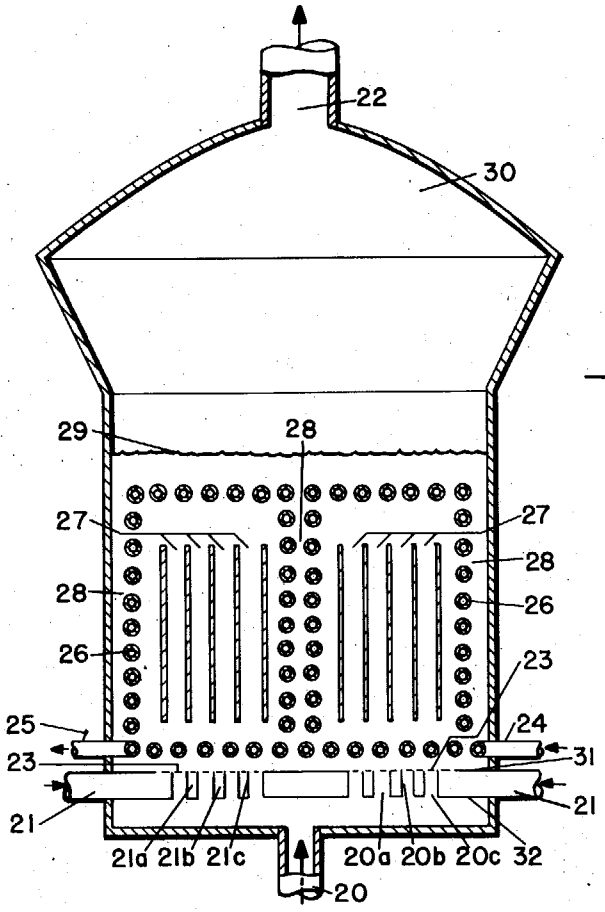
Figure 2 shows a view in elevation of a more elaborate reaction vessel wherein the bed is composed of a grid-like, cellular arrangement.

As shown in Figure 2, this grid-like or cellular member may be positioned within the main bed. Particulate solids are free to circulate down around and up through the cellular members. The reactor also comprises a feed inlet line 20 for admitting preheated and vaporized hydrocarbon, oxygen inlet lines 21 and an overhead product draw-off line 22 whence reaction product vapors are passed to condensers and other conventional recovery equipment. The inlet lines 21 are shown to lead to an illustrative oxygen distributing means which may comprise an upper grid or perforated tube sheet 31 and a lower tube sheet 32 which is solid except for holes adapted to hold the several open distributing tubes 20a, 20b, 20c, etc. which are held between sheets 31 and 32. The upper sheet 32 is preferably perforated only in the regions which face draft tubes 27, and solid in the regions which face down-flow areas 28 hereafter described. The fluidized bed extends from grid 23 to level 29. In this manner the hydrocarbon fed through line 20 into the bottom of the reactor is distributed across the bottom of the fluidized bed via tubes 20a, 20b, 20c, etc. and grid 23, while the oxygen introduced through lines 21 into the shell space constituted of sheets 31 and 32 is distributed through the perforations present in the upper sheet 31. The bed just above grid 23 serves to mix the oxygen and hydrocarbon and, in general, the temperature of the oxygen-hydrocarbon mixture in the immediate vicinity of grid 23 is below reaction temperature, i. e., below about 300° to 350° C. This temperature may be regulated by coils or heat transfer surfaces, wherein a cooling or heating fluid may enter via line 24 and leave via line 25.

Tubes 27, which may advantageously constitute a honeycomb structure, are open at the top and bottom. The oxygen-hydrocarbon mixture passes through the open portions of grid 23 and rises up through the adjacent draft tubes 27. This lifts fluidized solids up through these tubes in slug or bubble flow and permits the reaction to take place between the hydrocarbon and oxygen in the resulting voids or vapor pockets. The fluidized solids circulate down through areas 28 so they, in turn, can rise again up through draft tubes 27. Circulation of solids up through tubes 27 and down through areas 28 is facilitated because of the presence of slugs in tubes 27 and the essential absence of similar vapor pockets in areas 28, so that the apparent density is appreciably greater in the latter than in the tubes. Temperature control surfaces or coils 26 may regulate the temperautre of the fluidized solids so these solids are in the temperature range of 350° to 450° C. which initiates the hydrocarbon-oxygen reaction. Water, steam, or oil are suitable for flowing through coils 26 to pick up the excess heat of reaction. The upper portion 30 of the reactor may be enlarged to reduce the entrainment of the solids out line 22.

It is evident from Figure 2 that while the ratio of length to diameter for the overall bed in the reactor may be about 1 to 1, the zones 27 wherein reaction occurs can easily have a length to diameter ratios of 7 or more.

It may also be noted that instead of obtaining the desired volume of reaction-conducive gas phase within a single deep fluid bed as just described, it is possible and often preferable to operate the invention in a tower which contains a plurality of relatively shallow dense fluidized beds on superimposed trays in such a fashion that a dilute gas phase is situated between two successive dense beds.

In such a case the hydrocarbon and oxygen-containing feed may be injected into the dense bed on the bottom tray where the feed becomes preheated. The preheated feed then undergoes the desired partial oxidation upon emerging from the dense fluidized bed into the dilute or gas phase existing thereabove, and finally is quenched upon entering the next higher dense fluidized bed. Of course, it is possible to operate in a system containing a relatively large number of such superposed trays. In such a case the trays at the intermediate levels may serve both to quench the reaction product from the next lower gas phase and to mix into such product and to preheat any additional oxygen feed which may thus advantageously be injected in a multi-stage manner, avoiding unduly high local concentrations of free oxygen at any one point. Illustrative embodiments of a suitable tower are shown in Figure 3.

Figure 3:
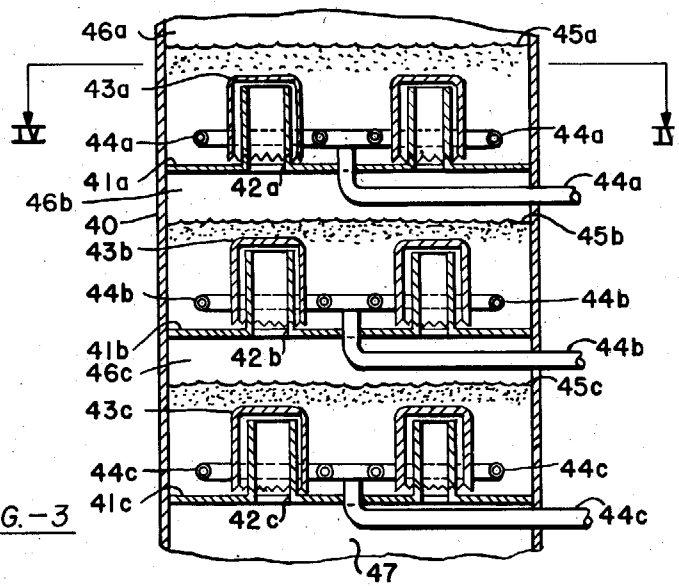
Figure 3 shows a view in elevation of still another, tray type reactor which has been found especially advantageous for carrying out selective hydrocarbon oxidation.

Figure 3 illustrates a bed-void reactor which has been found very suitable for carrying out the hydrocarbon-oxygen reaction in the preferred manner. Here the fluidized beds have a small length to diameter ratio, i. e., less than 1. In such beds, when well fluidized by choice of an appropriate particle size and gas velocity, the granular solids suppress the reaction as previously described. However, when the mixed hydrocarbon and oxygen gases encounter a void space, as already mentioned, their interaction occurs rapidly and in the preferred manner. Instead of obtaining the voids in the form of bubbles within a single bed, or by slug flow of the fluidized solids, they can be created in any number in the equipment of Figure 3.

Figure 4:
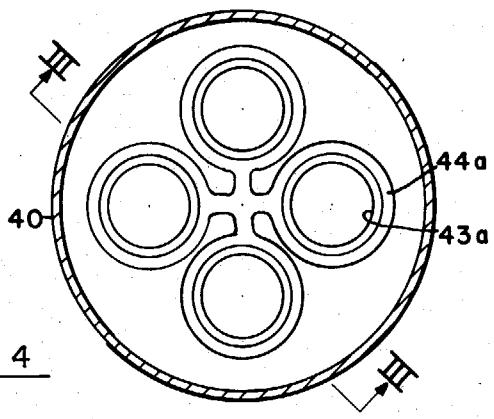
Figure 4 shows a horizontal section of the tray type reactor taken along line IV—IV in Figure 3.

Referring to Figures 3 and 4, the top of tower 40 may connect to the usual condenser and recovery equipment, while the vaporized hydrocarbon to be oxidized may be fed into its lower portion 47 in a manner similar to that illustrated in Figure 1. Tower 40 is shown as containing three decks or trays 41a, 41b, and 41c, but any suitable number can be utilized. Each tray is fitted with vapor risers 42a, 42b, and 42c; over these are fitted caps 43a, 43b, and 43c in a manner analogous to conventional bubble cap columns as used in fractional distillation. Further, each tray contains a bed of inert fluidized solids such as glass beads which may extend in depth from point 45a to tray 41a.

Oxygen for air is fed to each tray via pipes 44a, 44b, and 44c. These pipes may surround the caps 43a, etc., and are perforated so the effluent oxygen is evenly distributed into the vaporous hydrocarbon stream issuing from the bottom, or serrated edges, of caps 43a, etc. In this illustration about ⅓ of all the oxygen to be used is added on each tray.

Little or no reaction occurs in the well fluidized beds on trays 44a, 44b, and 44c. The particulate, granular, inert, solids inhibit the reaction. Thus the beds constitute a carburetor for intimate mixing of the oxygen and hydrocarbon. However, as soon as these two gaseous reactants enter void spaces or essentially solids-free pockets 46a, 46b, and 46c, above these respective dense beds of dense fluidized solids, chemical reaction rapidly occurs and usually most all the oxygen added in a bed is consumed in the void space directly above that bed.

Temperature control means, not shown, such as coils and tubes may be inserted in each dense bed. These serve to hold the beds of solids in the desired temperature range, namely from about 350° to 450° C. Alternatively, the trays may be provided with downcomers to allow the solids to be circulated downwardly through the tower and to an external fluid cooling tower, in the general manner illustrated in Patent No. 2,444,990.

The principal conversion products are oxygenated compounds such as $C_1$–$C_3$ aldehydes, acrolein, ketones, alcohols, epoxides, olefins, oxides of carbon and water. The chemical aspects of the reaction, as well as various possible finishing steps, are described in greater detail in copending application Serial No. 309,144, filed on September 11, 1952, now U. S. Patent 2,725,344, the disclosure of which is hereby incorporated herein by reference as far as pertinent. Referring to Figure 1 for illustration, the oxidation products in vapor phase may be from the upper part of reactor 10, preferably through a dust separating device such as cyclone 7, and passed through line 8 and condenser 9 to recovery equipment, not shown. After cooling in condenser 9, the products separate into a non-condensable gas, a liquid hydrocarbon layer, and a water layer. The low molecular weight aldehydes, ketones and alcohols are found mostly in the water layer while the epoxides and higher ketones and alcohols are concentrated in the hydrocarbon layer together with the olefins and unconverted hydrocarbon feed. For motor fuel purposes it may be advantageous to convert gum-forming aldehydes of the oxygenated hydrocarbon layer into more desirable compounds. Thus, light hydrogenation of the hydrocarbon layer may turn the aldehydes into desirable alcohols, or dehydration may be used to convert the various oxygenated compounds into olefins. Where desired, the water layer also may be hydrogenated to convert aldehydes and ketones into alcohols.

The following specific examples will serve further to illustrate the advantages of the present invention in comparison with a procedure typical of the prior art.

EXAMPLE 1

Normal heptane was non-catalytically oxidized in the vapor phase using 0.5 mole of oxygen per mole of heptane. In one run an empty vertical glass tube having a diameter of 2.5 inches and a length of 16 inches was used as the reactor in accordance with prior practice. In the other run the same tube was filled to a depth of 10 inches with 40–60 mesh Ottawa sand and otherwise arranged in accordance with this invention substantially as shown in Figure 1. However, no cooling coil was employed since the radiation heat losses to the ambient atmosphere were just sufficient for removing excess heat. The results obtained are summarized in Table 3.

TABLE 3

Non-catalytic oxidation of n-heptane

| Run No. | 1 | 2 |
|---|---|---|
| Reactor System | Empty Tube | Fluidized Sand |
| Hydrocarbon Feed | n-Heptane | |
| Feed Rate cc./min. | 8 | 8 |
| Oxygen/Heptane Mole Ratio | 0.50 | 0.55 |
| Temperature, ° C. | 370–380 | 450 |
| Conversion of Heptane (Wt. Percent) | 27.8 | 25.5 |
| Selectivity, (Wt.) Percent to Carbon and Hydrogen in (i. e., oxygen-free basis): | | |
| Methane | 3.2 } 7.1 | 1.9 } 3.2 |
| $C_2$–$C_3$ Paraffins | 3.9 | 1.3 |
| $C_2$–$C_3$ Olefins | 9.0 | 5.1 |
| $C_4$ Olefins | 6.0 | 4.2 |
| $C_5$–$C_6$ Olefins | 7.7 | 6.8 |
| $C_7$ Olefins | 10.2 | 11.5 |
| Formaldehyde | 1.2 | 1.0 |
| $C_2$+Higher Carbonyls | 18.9 | 28.7 |
| Epoxides | 28.9 | 32.0 |
| $CO_2$ | 0.6 } 11.0 | 1.1 } 7.5 |
| CO | 6.6 | 3.4 |
| $H_2O$ | 3.8 | 3.0 |
| Total Converted percent | [1] 100.0 | [2] 100.0 |

[1] 27.8% of Feed.
[2] 25.5% of Feed.

The conversion data show that the fluidized solids slightly inhibit the reaction, the conversion being lower in run 2 of Table 3 in spite of the higher temperature. However, the other results show that this loss in reactivity is more than compensated by the favorable effect of the solids on the selectivity of the oxidation. Specifically, despite a somewhat higher oxygen ratio, only about 7.5 weight percent of water and oxides of carbon were produced in run 2 of Table 3 as against 11.0 weight percent in run 1. Another significant difference is that the invention greatly reduced the pyrolytic cracking of the hydrocarbon feed. The data show that formation of uneconomical light paraffins is cut by more than one-half, from 7.1 to 3.2 percent, and formation of olefin molecules having fewer carbon atoms than the feed is cut by about one third, from 22.7 to 16.1 percent.

On the other hand the formation of the principally desired products such as $C_7$ olefins, i. e., simple dehydrogenation products, epoxides, and higher carbonyl compounds is significantly increased.

EXAMPLE 2

A still greater advantage of the present invention is shown at higher oxygen to hydrocarbon mole ratios. For this comparison, n-heptane was oxidized in one run in an empty tube, and in another run the oxidation was made in the presence of turbulently fluidized glass beads of 50–60 micron diameter. In each case about one mole of oxygen was being added per mole of hydrocarbon. The data are summarized in Table 4.

TABLE 4

| | Empty Tube | Fluidized Glass Beads |
|---|---|---|
| Temperature, ° C | 550 | 310 |
| Feed Rate (n-heptane), cc./min | 8.7 | 8.5 |
| $O_2/n\text{-}C_7$, mole ratio | 1.01 | 1.08 |
| Product Recovery: | | |
| Liquid Hydrocarbon Layer, Wt. Percent on Hydrocarbon Feed | 56.5 | 85 |
| Water Layer, Wt. Percent on Hydrocarbon Feed | 26 | 27 |
| Fixed Gas, Wt. Percent of Hydrocarbon Feed | 32 | 5.5 |
| Unconverted Feed, Wt. Percent | 11.5 | 60 |

The results in Table 4 show that the high oxygen concentration of the feed gases produces a considerably lower reaction temperature in the presence of the fluidized solids than in the empty tube, although no cooling was done in either case for the heat losses taking place from the reactor surface to the surroundings. More significant, where wasteful fixed gas products amounted to 32 percent of the weight of the hydrocarbon feed in the empty tube run, such gases amounted to only 5.5 percent in the run embodying the present invention. Also, subtracting the weight of unconverted feed from the total weight of the hydrocarbon layer, it can further be seen that the oxidation in the presence of the fluidized solids produces about 0.63 parts of valuable hydrocarbon layer products for every part of hydrocarbon feed actually converted, whereas in the empty tube only about 0.51 parts of such product is produced from every part of converted feed. Likewise, in the run with the fluidized solids only about 0.22 part of undesired fixed gas is produced for every part of useful hydrocarbon layer conversion product, whereas in the empty tube run the comparable ratio was 0.71.

EXAMPLE 3

Table 5 is a summary of data obtained in runs which illustrate the particular usefulness of a reactor designed in the form of a number of successive stages as shown in Figure 3. The reactor used was four inches in diameter, 21 inches in overall length and was constructed in the form of three separate stages each of which was composed of a bed of solids having a void or empty space above the bed. The beds were composed of either 300 or 600 micron size glass beads and served both as a carburetor for mixing oxygen with the hydrocarbon or hydrocarbon oxidation products leaving the reaction zone of the stages below, and as a heat exchanger for cooling the hot reaction gases from the zone below. The vapor flow rates were adjusted so that no discernible bubbles were formed in the solids. Thus, the reaction between the hydrocarbon and oxygen, air, or oxygen-containing gas took place in the voids above the beds; essentially no reaction occurred within the beds. The temperature of the beds was maintained slightly above the temperature required for initiation of rapid oxidation. The amount of oxygen injected at any one bed was controlled so that the temperature rise in the void space above the bed was not excessive for the hydrocarbon being oxidized. The hot reaction gases from one stage then passed into the bed immediately above and were rapidly cooled to the desired temperature before permitting any additional reaction to take place.

TABLE 5

Non-catalytic oxidation of hydrocarbons in a three-stage alternate bed-void reactor

| Feed | Solvent Naphtha [2] | | | Heavy Naphtha [3] | | n-Heptane |
|---|---|---|---|---|---|---|
| Run No. | 1 | 2 | 3 | 4 | 5 | 6 |
| Oxygen/Hydrocarbon Mole Ratio | 0.45 | 0.73 | 1.0 | 1.0 | 1.45 | 0.57 |
| No. Points of Oxygen Injection | 3 | 3 | 3 | 3 | 3 | 3 |
| Temperature of Beds, ° C | 350 | 350 | 350 | 350 | 350 | 345 |
| Maximum Temp. of Voids Above Beds, ° C | 400 | 410 | 410 | 400 | 410 | 410 |
| Percent Hydrocarbon Conversion | 28 | 43 | 55 | 55 | 65 | 41 |
| Percent Oxygen Conversion | 99 | 98 | 98 | 98 | 98 | 98 |
| Weight Percent Feed Recovered as C and H in Non-Condensable Gas | 3.5 | 6.5 | 9.7 | 8.0 | 11.5 | 7.6 |
| Weight Percent Feed Recovered as Liquid Products [1] | 99.3 | 96.8 | 92.0 | 98.3 | 92.4 | 92.9 |
| Volume Percent Feed Recovered as Liquid Products [1] | 95.8 | 91.7 | 86.0 | 92.8 | 85.4 | ---------- |
| Octane No. of Liquid Products, Research, clear | {Feed 67} 80 | 84.5 | 88 | {Feed 43} 79.5 | 82.3 | ---------- |
| Octane No. of Liquid Products, Research+1.5 ml. per gal. of Tetraethyllead | 79.5 90.5 | 93.5 | 95.3 | -------- 83.1 | 87.1 | ---------- |

[1] Combined hydrocarbon layer product after light hydrofining and organic material separated from water layer after hydrogenation of overall water layer.
[2] Light virgin naphtha of 112° to 260° F. boiling range from Redwater Canadian crude.
[3] Heavy virgin naphtha of 236° to 396° F. boiling range from East Texas crude.

The reactor described in Figure 3 is especially useful in controlling reaction temperatures over any desired narrow range. Such control is not possible in an empty tube as demonstrated above in Examples 1 and 2.

Table 6 lists properties of fluidized solids applicable to the present invention. Suitable inert solids may be silicious materials such as Ottawa sand, glass beads, spent clays, or alumina, coke, and the like. In general, the size of such solids may range between about 40 and 1000 microns in diameter, preferably about 40 to 200 microns when it is desired to form reactive vapor pockets in the fluidized bed proper, and between about 300 and 1000 microns when the bed is to serve principally as a non-active carburization or quenching zone. When it is especially desired to keep the solids content within gas bubbles to a minimum, still coarser particle sizes may be used. As shown in Table 6, beds of the general type described herein are characterized by a bulk or settled bed density of from about [50] *32* to nearly 300 pounds per cubic foot. [When aerated to form a dense fluidized bed, the apparent density of such a bed may range from about 20 to 40 pounds per cubic foot, whereas the] *The* sentially solids-free voids or vapor pockets within or between the dense beds may have a bulk density well below one pound per cubic foot, often as little as 0.1 pound or less per cubic foot.

TABLE 6

*Physical properties of granular solids*

| Material | Average Particle Diameter (Microns) | Particle Density (Lb./Ft.³) | Settled Bed Density (Lb./Ft.³) | Fraction Free Space (Settled Bed) | Free Fall Velocity [1] (Ft./Sec.) | Fluidization Velocity [2] (Ft./Sec.) | Specific Heat of Particle,[3] B. t. u./Lb. ° F. |
|---|---|---|---|---|---|---|---|
| Carbon Powder | 35 | 63 | 34 | 0.47 | 0.12 | Approx. 1/20 of the Free Fall Velocity. | 0.18 |
| Microspheres | 62 | 90 | 49 | 0.46 | 0.5 | | 0.23 |
| Glass Spheres | 104 | 170 | 104 | 0.38 | 2.0 | | 0.20 |
| Alumina ($Al_2O_3$) | 125 | 230 | 114 | 0.51 | 3.0 | | 0.18 |
| Glass Spheres | 308 | 176 | 110 | 0.38 | 8.0 | | 0.20 |
| Carbon Granules | 550 | 63 | 32 | 0.49 | 7.5 | | 0.18 |
| Glass Spheres | 600 | 176 | 110 | 0.38 | 15 | | 0.20 |
| Carbon Granules | 1,200 to 2,400 | 63 | 33 | 0.48 | 21 | | 0.18 |
| Copper Powder | 15 | 555 | 189 | 0.66 | 0.4 | Approx. 1/10 of the Free Fall Velocity. | 0.10 |
| Nickel Powder | 40 | 555 | 274 | 0.51 | 1.2 | | 0.12 |
| Aluminum Powder | <45 | 169 | 86 | 0.49 | 0.1 | | 0.23 |
| Steel Spheres | 400 | 485 | 272 | 0.44 | 21 | | 0.11 |
| Iron Spheres | 520 | 485 | 278 | 0.43 | 25 | | 0.11 |
| Steel Cylinders | 880 | 485 | 270 | 0.44 | 40 | | 0.11 |
| Steel Spheres | 1,000 | 485 | 280 | 0.42 | 45 | | 0.11 |
| Steel Spheres | 2,000 | 485 | 280 | 0.42 | 65 | | 0.11 |

[1] At 70° F. and 750 mm. Hg in air.
[2] These velocities are near the minimum values required for incipient fluidization with air at 70° F. and 750 mm. Hg.
[3] 20° C. to 100° C.

While the foregoing description and examples have referred to naphtha-type hydrocarbons generally and n-heptane specifically, it will be understood that this merely represents preferred or illustrative embodiments of the invention, rather than limits thereof. On the contrary, the invention is applicable, with varying effectiveness, not only to the oxidation of a wide variety of hydrocarbons, but even to other reactions of altogether different types.

The invention is useful in the selective non-catalytic oxidation of various hydrocarbon feed stocks which may boil over a wide temperature range and vary considerably in chemical composition. The essential requirement is that the feed be vaporous at reaction temperatures, which will usually lie between 275 and 480° C. and at the operating pressure employed. Pressures in the vicinity of 0 to 15 p. s. i. g. are generally suitable, but under proper conditions and for certain hydrocarbons or other reagents pressures as high as 50 or even 150 p. s. i. g. may be used. Inert diluents such as steam or nitrogen are suitable means for attaining additional vaporization where indicated. Using steam, for example, and atmospheric pressure in the reaction zone, materials having normal boiling points up to about 600° C. may be used as feed stock.

Thus, the invention is particularly effective for selective oxidation of normal or mono-methyl substituted paraffins having about 5 to 16 carbon atoms per molecule. However, excellent yields of useful products can similarly be obtained under proper conditions from the lower (i. e. $C_1$–$C_4$) paraffins, from the corresponding olefins and from naphthenes such as cyclohexane, methylcyclopentane, and methylcyclohexane. More generally speaking, oxidizable organic compounds which are thermally stable for at least a second or so at temperatures in the range of 300° to 500° C., and preferably those which contain substantial amounts of methylenic linkages, can be treated by the technique of this invention. In general, relatively low molecular weight, increasing unsaturation and increasing branchiness, all reduce the reactivity of the molecule and thus call for more drastic reaction conditions. Thus, in the partial oxidation of n-heptane in the presence of turbulent fluid solids, the reaction may be initiated at a temperature between about 260 to 310° C., preferably above about 280° C. By comparison, the initiation temperature of light virgin naphtha lies above 350° C., usually between about 380 and 400° C., largely because of the substantial amount of branched hydrocarbons normally present in such a fraction. Similarly, the effect of branchiness on the reactivity of the hydrocarbon is illustrated by isooctane which has an initiation temperature of about 450° C. or higher, depending on the particular system and conditions employed. Of course, the initiation temperature of any given feed can be readily determined by routine tests preliminary to treating such feeds according to this invntion.

In addition to the upgrading of hydrocarbons for fuel purposes, the invention may also be useful in processes aiming principally at the manufacture of oxygenated compounds such as alcohols, expoxides, ketones and aldehydes, hydrocarbon conversions of about 25 to 70 weight percent being representative. Total contact times may range from about 0.1 to 10 seconds, preferably about 0.5 to 3 seconds per stage.

Oxygen is advantageously used in ratios totalling between about 0.3 to 1.50 moles of oxygen per mole of hydrocarbon feed, though local concentrations may well be kept below these values, preferably below 1 or 1.25, and the total ratio may be raised up to about 1.75 if the oxygen is injected in stages at different levels. While pure oxygen is preferred, gases such as air which contain relatively low concentrations of oxygen may similarly be used as the oxidant, though in such cases more scrubbing of product may be required on the recovery end of the process if undue losses of valuable product fractions are to be avoided.

Lastly, it will also be understood that the multistage alternate bed-void type of reactor illustrated in Figure 3 may be used for carrying different reactions in sequence. Thus, oxidation of hydrocarbons may be carried out in the lower stages in the presence of inert solids substantially as described, while dehydration or dehydrogenation or the like of the oxidized products may be carried out in the upper stages in the presence of suitable known catalysts such as alumina or chromia.

The scope and spirit of the invention is particularly pointed out and claimed in the appended claims, and will be understood to include variations and modifications not explicitly described in the foregoing specification.

What is claimed is:

1. A process for homogeneous non-catalytic partial oxidation of oxidizable hydrocarbons vaporous at reaction temperature which comprises passing a stream of said hydrocarbons in alternating sequence upwardly through a plurality of dense phase regions and [void] *dilute* regions within a reaction zone, said dense phase regions containing turbulent finely divided fluidized non-catalytic solids [having an apparent density of about 20 to 40 lbs./cu. ft], *said solids having a settled bed density of about 32 to 300 lbs./cu. ft.*, and said [void] *dilute* regions containing an essentially homogeneous vapor phase having an apparent density of not more than 1 lb./cu. ft., contacting the said hydrocarbon stream in said dilute regions at a reaction temperature between about 275° and 480° C. with a free oxygen containing gas for a contact time up to about 10 seconds, in amounts such that the local mole ratio of oxygen to hydrocarbon is not in excess of about 1.25 whereby the hydrocarbon containing vapor phase is selectively oxidized and heated, contacting the selectively oxidized vapors with the [densed] *dense* fluidized solids to maintain the desired temperature, cooling the finely divided solids to remove the excess heat of reaction, and withdrawing the oxidized reaction products from an upper portion of the reaction zone.

2. A process according to claim 1 wherein oxygen is injected into the reaction zone at a plurality of vertically spaced points in amounts such that the total oxygen/hydrogen mole ratio is between about 0.3 and 1.75 and residence time at reaction temperatures not in excess of 3 seconds per oxygen injection.

3. A process according to claim 2 wherein the feed contains hydrocarbons of up to 16 carbon atoms possessing substantial amounts of methylenic linkages, and the local oxygen/hydrogen mole ratio is not in excess of 1.

4. A process according to claim 2 wherein the cooling of the solids is done by indirect heat exchange with a fluid cooling medium within the reaction zone.

5. A process according to claim 2 wherein the non-catalytic solids have a particle diameter of about 40 to 220 microns and wherein the gaseous reaction mixture is passed upwardly through the reaction zone at a linear superficial velocity of about 0.5 to 1.5 feet per second.

6. A process for non-catalytic oxidative dehydrogenation of oxidizable hydrocarbons vaporous at reaction temperature which comprises passing a stream of the said hydrocarbons at substantially atmospheric pressure in alternating sequence upwardly through a plurality of dense phase beds and [void] *dilute* regions, said dense phase beds containing turbulent finely divided fluidized solids [having an apparent density of about 20 to 40 lbs./cu. ft.], *said solids having a settled bed density of about 32 to 300 lbs./cu. ft.*, and said [void] *dilute* regions containing an essentially homogeneous gas phase having an apparent density of not more than about 1 lb./cu. ft., the solids in at least the lowermost bed being non-catalytic, contacting the said hydrocarbon stream in said dilute regions at a reaction temperature between about 300 and 375° C. with free oxygen in a mole ratio of oxygen-to-hydrocarbon feed of about 0.3 to 1.5, whereby the hydrocarbon feed is selectively oxidized and heated above the optimum reaction temperature, cooling said selectively oxidized hydrocarbon stream to optimum temperature in the said dense phase regions by contact with the fluidized solids, cooling the finely divided solids to remove excess heat of reaction, and withdrawing the reaction products from at least one of the upper [void] *dilute* regions.

7. A process according to claim 6 wherein said oxidizable hydrocarbons are essentially unbranched aliphatic hydrocarbons containing between 5 and 16 carbon atoms per molecule, and wherein a portion of the oxygen feed is mixed with the original hydrocarbon feed and an additional portion of oxygen is mixed into the reaction mixture in one of the intermediate dense phase beds.

8. A process according to claim 6 wherein the solids in at least one of the upper beds comprise a dehydrogenation catalyst.

9. A process according to claim 6 wherein the solids in at least one of the upper beds comprise a dehydration catalyst.

References Cited in the file of this patent or the original patent

UNITED STATES PATENTS

| | | |
|---|---|---|
| 2,128,909 | Bludworth | Sept. 6, 1938 |
| 2,432,745 | Gary | Dec. 16, 1947 |
| 2,444,990 | Hemminger | July 13, 1948 |
| 2,503,291 | Odell | Apr. 11, 1950 |
| 2,616,898 | Keith | Nov. 4, 1952 |
| 2,631,921 | Odell | Mar. 17, 1953 |
| 2,674,612 | Murphree | Apr. 6, 1954 |